(12) United States Patent
O'Connor et al.

(10) Patent No.: US 8,033,140 B1
(45) Date of Patent: Oct. 11, 2011

(54) METHOD FOR THE PRODUCTION OF MINERAL WOOL AND IRON FROM SERPENTINE ORE

(75) Inventors: William K. O'Connor, Albany, OR (US); Gilbert E. Rush, Scio, OR (US); Glen F. Soltau, Lebanon, OR (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 513 days.

(21) Appl. No.: 12/124,421

(22) Filed: May 21, 2008

(51) Int. Cl.
*C03B 37/01* (2006.01)
(52) U.S. Cl. .......................... 65/376; 501/36
(58) Field of Classification Search ............ 501/11, 501/36, 35; 65/376, 454, 524, 483
See application file for complete search history.

(56) References Cited

U.S. PATENT DOCUMENTS

| | | | | |
|---|---|---|---|---|
| 4,365,984 A | * | 12/1982 | Gee | 65/376 |
| 4,830,989 A | * | 5/1989 | Trivedi et al. | 501/35 |
| 5,045,506 A | * | 9/1991 | Dube et al. | 501/35 |
| 2002/0027316 A1 | * | 3/2002 | Ishikawa et al. | 264/669 |

\* cited by examiner

*Primary Examiner* — Matthew Daniels
*Assistant Examiner* — Yana Belyaev
(74) *Attorney, Agent, or Firm* — James B. Potts; Brian J. Lally; John T. Lucas

(57) ABSTRACT

Magnesium silicate mineral wools having a relatively high liquidus temperature of at least about 1400° C. and to methods for the production thereof are provided. The methods of the present invention comprise melting a magnesium silicate feedstock (e.g., comprising a serpentine or olivine ore) having a liquidus temperature of at least about 1400° C. to form a molten magnesium silicate, and subsequently fiberizing the molten magnesium silicate to produce a magnesium silicate mineral wool. In one embodiment, the magnesium silicate feedstock contains iron oxide (e.g., up to about 12% by weight). Preferably, the melting is performed in the presence of a reducing agent to produce an iron alloy, which can be separated from the molten ore. Useful magnesium silicate feedstocks include, without limitation, serpentine and olivine ores. Optionally, silicon dioxide can be added to the feedstock to lower the liquidus temperature thereof.

17 Claims, 11 Drawing Sheets

METHOD FOR THE PRODUCTION OF MINERAL WOOL AND IRON FROM SERPENTINE ORE

GOVERNMENTAL RIGHTS

The United States Government has rights in this invention pursuant to Contract No. 04-14-HRL from the U.S. Department of Energy (DOE).

FIELD OF THE INVENTION

This invention relates to mineral wools and methods of producing mineral wools. In particular, this invention relates to magnesium silicate-based mineral wools and methods of producing the same.

BACKGROUND OF THE INVENTION

Asbestos is the common name for a group of fibrous minerals having relatively long and thin fibrous crystals. Asbestos was a widely used material for heat insulation in building materials and in various industrial applications in the United States from the late 19th century to the last quarter of the 20th century. Asbestos is still used in some applications (e.g., brake shoes and gaskets) today. The popularity of asbestos insulation was due, at least in part, to the very high resistance to heat, electricity, and chemical damage, high mechanical strength, as well as good acoustic insulation properties of the material. In many heat insulation applications, asbestos fibers are combined with a binder to form sheets, or are woven into fabrics or mats. The major drawbacks to the use of asbestos are the health and environmental hazards associated with exposure to the asbestos fibers. Asbestos exposure is linked to several serious illnesses, including mesothelioma, various forms of cancer, and asbestosis. Since the mid 1980s, many uses of asbestos have been banned around the world, particularly in applications where there would be wide spread workplace or consumer exposure.

Accordingly, there is an on-going need for alternatives to asbestos insulation materials due to the known health and environmental hazards associated with asbestos, particularly, for asbestos replacements having a liquidus temperature and heat resistance as close to that of asbestos as is feasible. The present invention provides such alternative asbestos replacement products and methods for producing such products.

SUMMARY OF THE INVENTION

This invention relates to magnesium silicate mineral wools having a relatively high liquidus temperature of at least about 1400° C., and to methods for the production of such mineral wools. The methods of the present invention comprise melting a magnesium silicate feedstock (e.g., comprising a serpentine or olivine ore) having a liquidus temperature of at least about 1400° C. to form a molten magnesium silicate process stream, and subsequently fiberizing the molten process stream to produce a magnesium silicate mineral wool. The magnesium silicate mineral wools of the invention have an olivine-type mineral structure, which coupled with the high liquidus temperature, provides a heat insulation material with a temperature resistance superior to mineral wool asbestos replacement materials made from basalt-like feedstocks.

Mineral wool is composed of randomly oriented mineral fibers. Typically, mineral wools are produced by melting a mineral ore such as basalt, and extruding or otherwise dispersing a stream of the molten ore in a manner suitable to produce fibers upon cooling. For example, a stream of molten ore can be spun and air blasted with high pressure air to form fine fibrous strands. The resulting fibrous mineral wool can be processed in essentially the same manner as asbestos.

The first step in a typical mineral wool production process is melting the mineral feedstock. The raw feedstock is loaded into a furnace and heated to the molten state. The molten ore is then discharged from the furnace into a fiberization device. Much of the mineral wool produced in the United States is made from basalt and basalt-like feedstocks by some variation of two common fiberization methods. The so-called "Powell process" utilizes a plurality of rotors that revolve at a high rate to disperse the molten ore by centrifugal force into many thin filamentous streams (filaments) that are flung into an open chamber. The chamber is designed to provide a sufficient free path so that the filaments can cool and solidify to form fibers before contacting a solid surface. Blasts of air or steam are often used to aid in the dispersion and cooling of the molten ore filaments.

Another common fiberization method is the so-called "Downey process", which uses a spinning concave-shaped vessel in combination with air or steam to disperse the molten ore into filaments. Molten ore is thinly distributed over the concave surface of the vessel, and flows up and over the edge due to centrifugal force. The molten material that reaches the upper edge of the vessel is flung away by centrifugal force and is further dispersed by a high-velocity blast of steam or air to form thin filamentous streams, which cool into fibers as described above.

In all mineral wool fiberization processes, some of the molten material forms globules (also known as shot) in addition to fibers. In many raw mineral wool products, as much as half of the mass of the product may consist of shot, which can then be separated from the fibrous mineral wool by gravity, if necessary. Often the separated shot can be recycled back into the feedstock and re-melted to increase effective fiber yields.

Typical mineral wool fiber is produced from basalt, diabase, and similar materials, which have a liquidus temperature (melting point) in the range of about 1100 to about 1200° C. Such basalt-based mineral wool provides insulation at a temperature rating in the same range as the liquidus temperature, which is considerably lower than the temperature rating for asbestos-based insulation, however.

In one embodiment, the present method comprises melting a magnesium silicate feedstock containing iron oxide (e.g., up to about 12% by weight of magnetite or other iron oxide material) and having a liquidus temperature of at least about 1400° C., in the presence of a reducing agent, to provide a molten process stream containing magnesium silicate and an iron alloy. The molten process stream is then fiberized to form a magnesium silicate mineral wool of the present invention. Molten magnesium silicate and a molten iron alloy in the process stream can be separated from one another prior to fiberization, if desired. The separated iron alloy then can be utilized as a feedstock for iron production or can be directly utilized to fabricate iron ingots, bars, wires, and the like for use in commerce.

In another embodiment, the present invention provides a method for producing a magnesium silicate mineral wool in which a silicon dioxide (silica) material (e.g., quartz) is added to the magnesium silicate feedstock prior to melting. The presence of silicon dioxide beneficially aids in melting and fluidizing the process stream, and can lower the liquidus temperature of a serpentine feedstock that normally melts at about 1600° C. down to about 1400° C.

In another aspect, the present invention provides a magnesium silicate mineral wool having a liquidus temperature of at least about 1400° C. and comprising an olivine-type magnesium silicate structure. Preferably, the fibers of the mineral wool have a mean diameter in the range of about 1 to about 10 microns, and a mean fiber length in the range about 8 to about 80 microns.

Non-limiting examples of magnesium silicate feedstocks useful in the practice of the present invention include serpentine, olivine, antigorite, lizardite, chrysotile, talc, forsterite, dunite, combinations of two or more of the foregoing, and the like.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
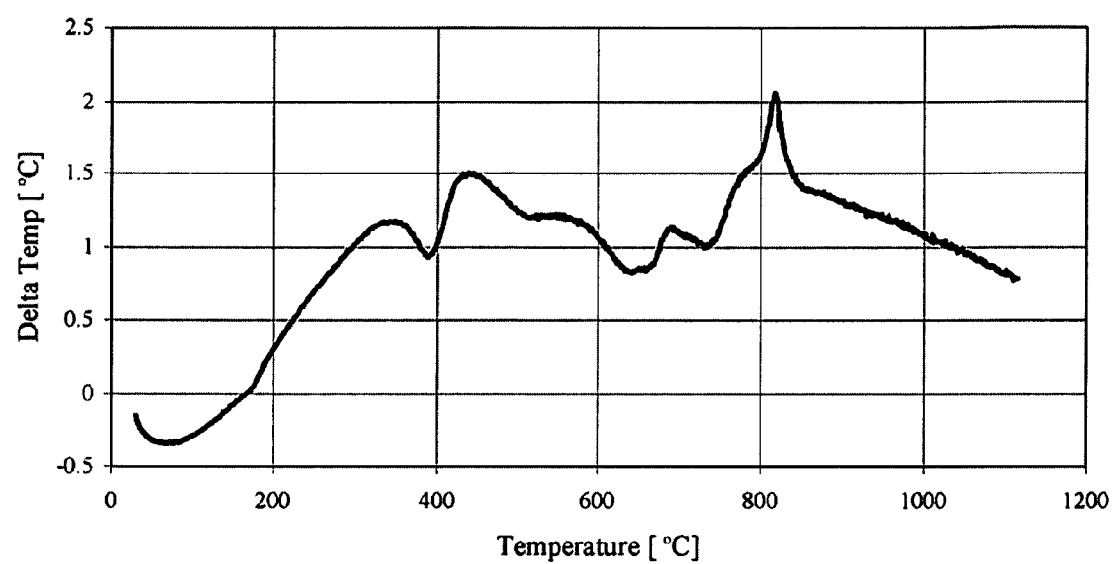
FIG. 1 shows a differential thermal analysis (DTA) plot of a serpentine feedstock.

Serpentine ore comprises hydrated magnesium silicate (e.g., $Mg_3Si_2O_5(OH)_4$ and the like), and can include varying amounts of other minerals, such as iron oxides (e.g., magnetite). Typical serpentine has a liquidus temperature of about 1600 to 1650° C. One preferred serpentine ore that is useful in the methods of the present invention comprises up to about 12 percent by weight of an iron oxide (e.g., FeO, $Fe_2O_3$, $Fe_3O_4$, or combinations thereof), for example, about 5 percent by weight of magnetite ($Fe_3O_4$). Serpentine minerals include antigorite, lizardite, and chrysotile, each of which is useful in the methods of the present invention. Olivine is a mineral group name for a solid solution series containing varying amounts of magnesium silicate (forsterite; $Mg_2SiO_4$) and iron silicates (fayalite; $Fe_2SiO_4$). For use in the present invention, it is preferred that olivine-based feedstocks comprise a majority (preferably at least about 90 percent by weight) of forsterite. Talc is a hydrated magnesium silicate having the empirical formula $Mg_3Si_4O_{10}(OH)_2$. Dunite is a rock that comprises of over 90 percent by weight olivine. Any magnesium silicate ore having a liquidus temperature of about 140° C. or greater (preferably about 1400 to about 1650° C.) can be used as a feedstock in the present invention, including serpentine ores (e.g., antigorite, lizardite, chrysotile), olivine ores (e.g., forsterite, dunite), talc, and combinations of two or more of the foregoing.

Many serpentine ores contain varying amounts of iron oxide. One ore examined contained roughly 5 percent by weight magnetite ($Fe_3O_4$), typical for most serpentine ores. During the course of melting serpentine ore in an electric arc furnace (EAF), roughly 50% of the magnetite in the ore is reduced to metallic Fe due to exposure to the carbon in the graphite electrodes of the EAF. The remainder of the magnetite is converted into fayalite olivine in solid solution with the primary product phase, forsterite olivine. This iron reduction cannot be avoided in an EAF, but does represent a potentially useful by-product stream for the production of cast iron or high carbon steel. The iron reduction can also be enhanced, if desired, by the addition of a carbon reductant (coal, coke, and/or charcoal), to improve iron reduction efficiency from ores with a higher iron oxide concentration. During continuous operation, the metallic Fe heel would be allowed to accumulate on the furnace bottom, until such time that a sufficient quantity was amassed to produce an iron product tap. Iron yields would be approximately 100 lb iron/ton of ore from a typical serpentine ore. Thus, the iron product likely would be tapped from the furnace intermittently, e.g., once per 15-20 tons of ore melted, depending on the furnace size. The furnace could be designed with two tap holes, an upper tap for molten magnesium silicate removal and fiberization, and a lower tap for iron removal. The tap holes could be sited about 180 degrees from one another in a typical design, to avoid interference with the fiberization system.

It has been found that heat treatment of serpentine ore at a temperature below the liquidus of the ore, but at least in excess of about 600° C. (preferably about 630° C. or greater) beneficially leads to dehydroxylation, i.e., the removal of hydroxide (OH) ions, commonly regarded as chemically-bound water, from the ore. The elimination of this chemically bound water produces an olivine-type magnesium silicate product when dehydroxylation is taken to completion. This transformation is depicted in the differential thermal analysis (DTA) plot in FIG. 1 as an exotherm at approximately 820° C. Because the heat treatment specified here is conducted at a temperature below this transformation temperature, the heat-treated product is better described as a meta-serpentine. Direct melting of serpentine ore, without heat treatment, leads to rapid release of chemically bound water as steam, which can be entrapped in the bulk molten ore. The steam can be rapidly released at an outer surface of the melt, which in turn leads to undesirable local cooling and formation of a solid film (skull formation) on the equipment. Heat-treatment at a temperature below the liquidus drives off chemically bound water while the ore remains in the solid state, thus avoiding water entrapment that can occur in the liquid state. The meta-serpentine material produced from serpentine by heat-treatment has superior melting characteristics to non-heat-treated serpentine in the context of the present invention (e.g., more rapid melting, lower viscosity, and less skull formation), more likely than not due to the lower volatile content of the molten process stream. Accordingly, one preferred aspect of the methods of the present invention utilizes a meta-serpentine feedstock, such as that which is produced by heat-treating serpentine at a temperature of at least about 630° C., but below the liquidus temperature, to dehydroxylate the ore prior to melting.

For the practice of the present invention, the magnesium silicate feedstock can be melted in any suitable manner and in any suitable heating apparatus, many of which are known in the art. Due to the relatively high liquidus temperature of magnesium silicate ores, a preferred heating method utilizes an electric arc furnace. It is preferable that the ore feedstock have a relatively small particle size, e.g., a maximum diameter of less than about ¾ of an inch (about 19 mm). Such a particle size can be obtained by sieving and/or crushing the ore prior to melting.

Figure 2:
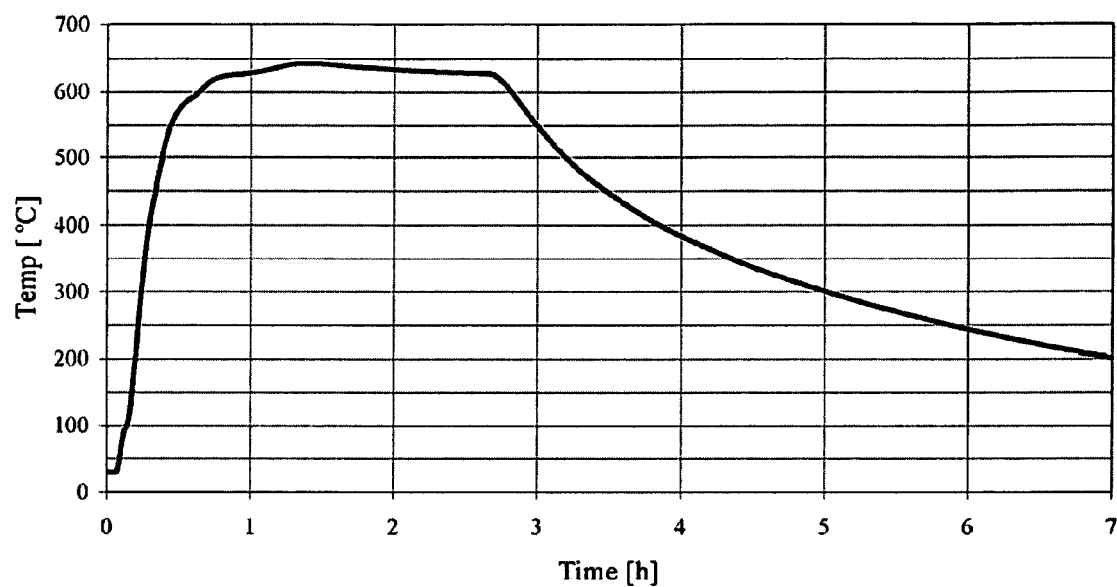
FIG. 2 shows the temperature profile for a typical 2 hour heat treatment operation on a serpentine feedstock.
Figure 3:
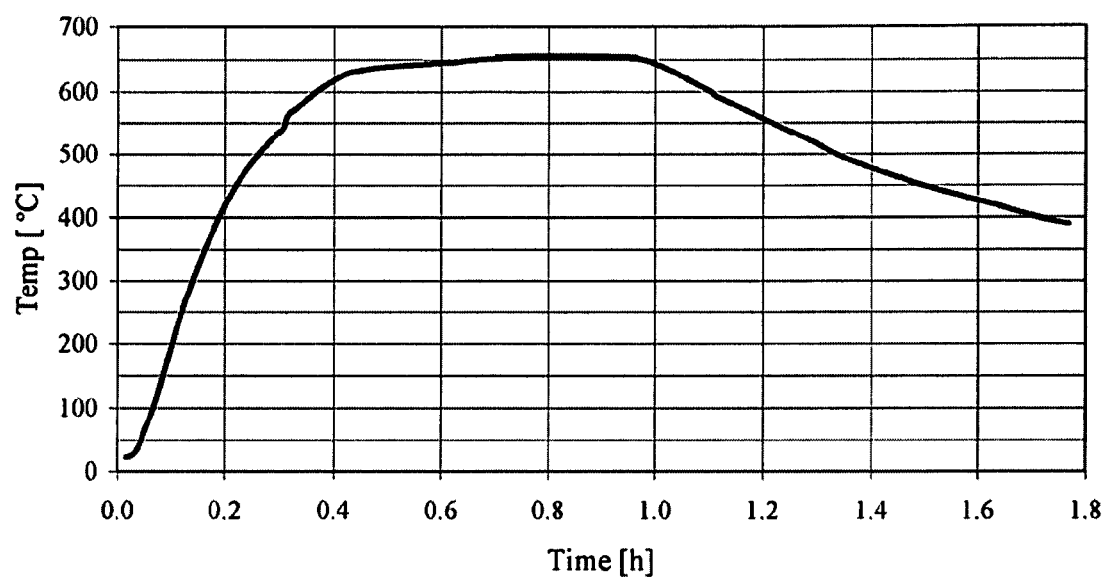
FIG. 3 shows the temperature profile for a typical ¼ hour heat treatment operation on a serpentine feedstock.

When a serpentine ore feedstock is to be heat-treated prior to melting, a maximum particle diameter of about ¼ inch (about 6.35 mm) is desirable (e.g., obtained by crushing and/ or sieving the ore). The time required for the heat treatment is largely dependent on the particle size of the ore, as depicted in FIGS. 2 and 3, which show typical temperature profiles for 2 hour and ½ hour heat treatment operations, respectively. Smaller particle size facilitates dehydroxylation during heat treatment, and thus requires less time, and also facilitates melting of the feedstock, probably due, at least in part, to better heat transfer from the higher surface area of the smaller particles.

Heat-treatment of the ore can be performed as part of a continuous process, beginning with as received, crushed ore, e.g., in a conveyor-type oven, a rotating kiln, a traveling grate, or similar such equipment, with the heat-treated ore being directly discharged into the melting furnace or into a feed-hopper for discharge into the melting furnace. In this practice, the exhaust gases from the melting furnace may be directed counter-current to the feed stream, providing both the heat necessary for the heat-treatment operation and the sweep gas to carry the evolved water from the ore. Alternatively, the heat-treatment can be performed as a separate process stream, in which heat-treated ore is stored for later use in the mineral wool production process. Preferably, the heat-treatment is performed by heating the ore in a direct-heated oven/furnace at about 600° C. to about 650° C. for about 30 to about 120 minutes/ton of ore.

In the methods of the present invention, the temperature of the feedstock during the process can be determined by any suitable method, such as by optical (infrared) pyrometry, as is well known in the art.

During fiberization, premature cooling of the molten process stream can lead to the bulk solidification of portions of the process stream within the fiberization apparatus, and excessive shot formation, lowering the effective fiber yield. The significance of temperature control during the process was evident from various test fiberization runs performed with serpentine ore. In particular, it was found that the temperature of the entire molten process stream should be maintained above the liquidus temperature, to the extent possible, throughout the entire post-melt process, up to the point at which the process stream is dispersed into filaments. In order to provide optimal fiber yields, it is therefore desirable to maintain the temperature of the molten process stream well above the liquidus temperature throughout the process, preferably at least 50° C. above the liquidus, more preferably at least 100° C. above the liquidus, and most preferably at least about 150° C. above the liquidus temperature. Any shot formed during fiberization can be, and preferably is, recycled as a feedstock component in the process. Recycle of non-fibrous by-products leads to higher effective fiber yields compared to processes that do not utilize recycled feedstock.

Methods of fiberizing molten process streams are well known in the art, as discussed above. Any suitable fiberization and molten ore dispersion technique can be utilized in the practice of methods of the present invention. For example, the molten process stream can be dispersed centrifugally (e.g., by applying a stream of molten material onto the surface of a spinning disk or a spinning vessel), by pressurized ejection from one or more nozzles, by extrusion, by blasting with pressurized gas (e.g., air), by a combination of two or more of these techniques, and the like. Once a process stream has been dispersed into a number of finer molten filaments of appropriate size, cooling and solidification of the finely dispersed filaments leads to fiber formation, so long as the molten filaments do not contact a solid surface prior to solidification.

Typically, an apparatus for mineral wool production includes a molten process stream dispersing apparatus, a cooling chamber, and a fiber collection apparatus. Fiberization cooling chambers typically are sized and configured to allow the molten filaments to travel freely through air or some other gas at a suitably lower temperature than the molten process stream, for a sufficient period of time and for a sufficient distance to allow the filaments to grow to a suitable size and to into fibers prior to contacting a solid surface. In a preferred embodiment, the molten process stream is fed through one or more orifices to form one or more relatively narrow streams of molten material, which preferably are further dispersed (e.g., utilizing pressurized air) into finer filamentous stream lets in a duct or chamber where the filaments can freely travel, cool, and solidify into fibers prior to contacting any solid surface of the processing equipment. The resulting solidified mineral wool fibers are then collected by any suitable method or apparatus. For example, the fibers are collected on a screen, or can be pneumatically conveyed to a cyclone for bulk collection, and the like. Preferably, the collection system includes a device for separating shot from fiber, as is known in the art.

The shot produced during the fiberization process is best described as forsterite olivine. Recycled shot from previously melted ore makes excellent feed for fiberization, because all chemically-bound water originally contained in the ore has been removed. The particle size of the shot, typically about minus 0.125-in, is also an appropriate feedstock size, limiting dust entrainment to the furnace offgas. However, due to the iron oxide reduction in the EAF, the iron oxide concentration in the recycled product decreases with each cycle through the furnace. This results in a purer forsteritic olivine product, but also increases the liquidus temperature for the molten feedstock. The Fe end member in the olivine solid solution series, fayalite, effectively lowers the liquidus, and excessive removal of the Fe during continuous recycle could become problematic, driving the required operating temperatures higher. This issue can be overcome by limiting the percentage of recycled shot in the furnace feed, thus using a mixture of virgin raw material and recycled shot, if desired. Alternatively, the addition of silica to the feedstock, as described above, counteracts the negative effects of lower iron oxide content in the feedstock ore.

The mineral wool products formed by the methods of the present invention beneficially have a temperature resistance that is superior to basalt-based mineral wools. In addition, the mineral wools of the present invention have an olivine-type crystal structure, regardless of the crystal structure of the original feedstock ore. The mineral wool products of the present invention have a liquidus temperature of at least about 1400° C. (e.g., about 1400 to about 1600° C.), and preferably have a fiber diameter in the range of about 1 to about 10 microns, and a mean fiber length in the range of about 8 to about 80 microns.

The following non-limiting Examples are provided to further illustrate certain aspects of the present invention.

Example 1

Serpentine Ore Melting Characteristics

The degree to which heat-treatment and chemical modification of a serpentine ore feedstock affects melting characteristics was assessed in the following manner. A serpentine ore having the chemical composition shown in Table 1 was crushed and passed through a ¼-inch sieve prior to heat treatment at about 1200° F. (about 650° C.). Another sample of the ore was passed through a ¾-inch sieve ("minus ¾-inch ore") and the melting characteristics were examined without prior heat treatment. In another evaluation, the minus ¾ inch ore was heat-treated at about 1600° F. (870° C.). The impact of the various heat treatments on melting characteristics was pronounced. The non-heat-treated ore required a longer melt time, and exhibited inferior melting characteristics (e.g., skull formation and high viscosity), relative to the heat-treated samples, possibly due to the higher volatile content in the non-treated ore. The raw ore had a liquidus temperature of about 1550 to about 1600° C. Bridging (clumping) of the partially melted feedstock particles was particularly problematic, and resulted in excessive skull formation. The minus ¾-inch ore that was heat-treated at the higher temperature of about 850° C. exhibited a similar liquidus temperature and had better melting characteristics in terms of reduced bridging and relatively more rapid melting rate.

The weight loss achieved at the higher heat treatment temperature (i.e., loss of chemically bound water) was nearly double that achieved by the lower temperature heat-treatment, which illustrates the impact of particle size on the effectiveness of the heat treatment procedure. The relatively large particle size (minus ¾-inch) for this particular ore sample required higher heat treatment temperature for effective removal of chemically-bound water. However, as shown in FIGS. 2 and 3, heat treatment times can be reduced by utilizing a smaller particle size for the ore. It was also determined that the lower heat treatment temperature (about 650° C.) can be effective if the particle size of the ore is reduced. Based on these findings, a particle size of at least minus ¼-inch (6.3 mm) and preferably minus 10 mesh (0.2 mm) is recommended for heat treatment of the serpentine ore.

Figure 4:
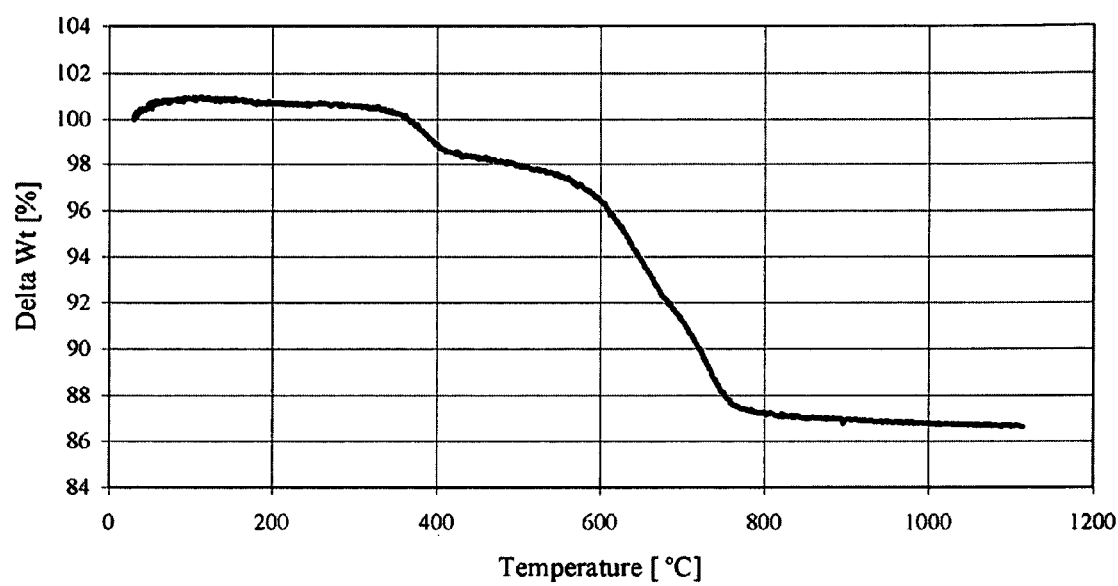
FIG. 4 shows a thermogravimetric analysis (TGA) plot of a serpentine feedstock.
Figure 5:
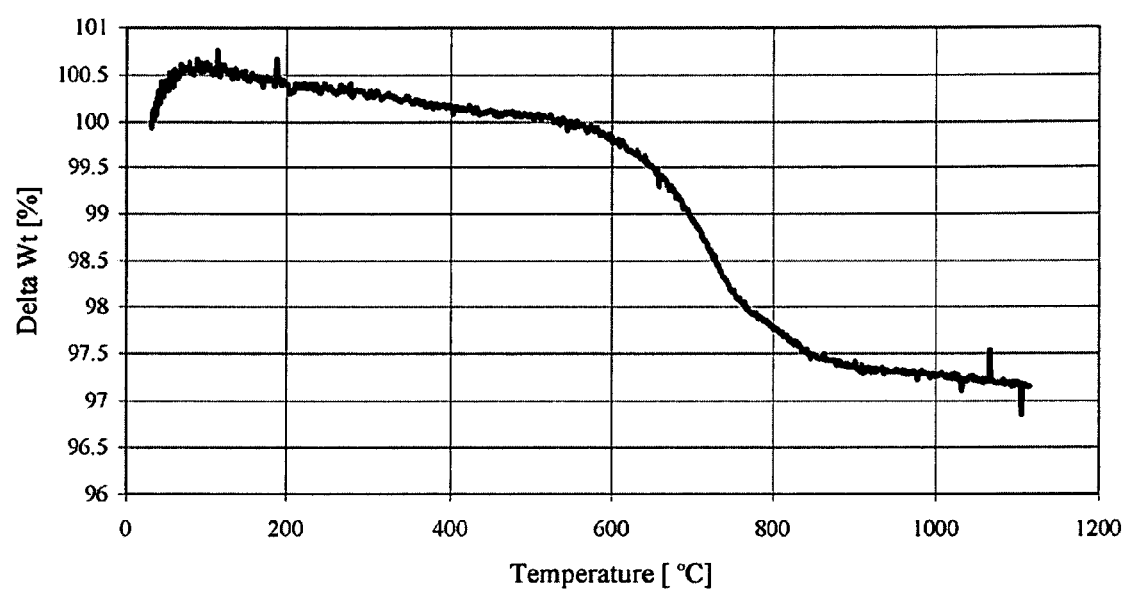
FIG. 5 shows a TGA plot of a heat-treated serpentine feedstock.

The thermal gravimetric analyses (TGA) depicted in FIG. 4 and FIG. 5 depict weight loss from the serpentine ore and heat-treated product. The plot in FIG. 4, of the non-treated serpentine ore sample, clearly shows two distinct temperatures where weight loss occurs, one at about 400° C., and the other just above 600° C. The TGA plot for the heat-treated product (FIG. 5) shows up to an additional 3% weight loss after heating above 600° C. This reflects the residual chemically-bound water that remained after the heat treatment step, and suggests that heat treatment temperatures of about 1150° F. (630° C.) or greater are preferable to remove as much of the volatile constituents from the ore as possible.

Chemical analyses of the raw serpentine ore and heat-treated ore are included in Table 1. The $CO_2$ content shown in Table 1 is due to the presence of magnesite ($MgCO_3$) as verified by X-ray diffraction (XRD) analysis. This is also evident on the TGA plot in FIG. 4 as the weight loss at about 400° C. Magnesite is calcined (i.e., $CO_2$ is removed) at about 350° C., and this weight loss at the lower temperature is almost certainly due to the evolution of $CO_2$ from the ore.

TABLE 1

| | Serpentine Ores | | | | | | | |
| | Antigorite #1 | | Antigorite #2 | | Lizardite | | | |
| Species | Ore | Heat-treated | Ore | Heat-treated | Ore | Heat-treated | Olivine | Talc |
| --- | --- | --- | --- | --- | --- | --- | --- | --- |
| $Al_2O_3$ | 5.57 | 5.88 | 0.17 | 0.20 | 1.50 | 1.73 | 0.17 | 0.07 |
| CaO | 3.28 | 2.86 | 0.22 | 0.09 | 0.44 | 0.49 | 0.16 | 0.12 |
| C, fixed | 0.10 | 0.03 | 0.03 | 0.01 | 0.09 | 0.03 | 0.03 | 0.01 |
| $CO_2$ | 4.36 | 1.26 | 0.81 | 0.24 | 0.26 | 0.12 | <0.10 | <0.10 |
| $Cr_2O_3$ | 0.14 | 0.14 | 0.03 | 0.11 | 0.16 | 0.16 | 0.05 | <0.01 |
| FeO | 6.90 | 3.16 | 3.66 | 0.85 | 3.09 | <0.01 | 7.71 | 1.12 |
| $Fe_2O_3$ | 0.69 | 5.60 | 3.42 | 7.30 | 2.89 | 9.17 | <0.01 | <0.01 |
| MgO | 27.50 | 33.84 | 43.34 | 47.01 | 39.84 | 43.01 | 51.88 | 30.51 |
| NiO | 0.18 | 0.24 | 0.25 | 0.29 | 0.18 | 0.25 | 0.30 | 0.01 |
| $K_2O$ | 0.36 | 0.35 | <0.01 | 0.01 | 0.02 | 0.03 | 0.01 | 0.01 |
| $SiO_2$ | 43.90 | 45.64 | 36.43 | 40.50 | 38.57 | 43.50 | 40.50 | 61.71 |
| $Na_2O$ | 1.35 | 1.02 | 0.01 | 0.01 | 0.01 | 0.02 | 0.01 | 0.05 |
| $H_2O$ - hydration | 0.14 | 0.10 | 0.60 | 0.75 | <0.05 | 0.58 | 0.07 | 0.18 |
| $H_2O$ - bonded | 7.20 | 6.39 | 12.07 | 3.59 | 12.86 | 3.45 | 0.29 | 4.73 |
| Total | 101.67 | 106.51 | 101.04 | 100.96 | 99.91 | 102.54 | 101.18 | 98.51 |

The crystalline phases of the serpentine ore sample #1 identified by XRD analysis include antigorite serpentine as a primary phase, with Ca-bearing albite (a feldspar mineral) and quartz ($SiO_2$) as secondary phases, magnesite as a minor phase, talc and clinochlore as trace phases, and a mica mineral, likely muscovite, as a probable trace component. The XRD terminology referring to the qualitative concentrations of the various phases in the sample is based on the peak intensities and operator's interpretation of the diffraction pattern. The following ranges are assigned to each category, as percentage by weight: primary phase, 40-100%; secondary phase, 20-60%; minor phase, 5-30%, and trace phase, 1-10%. The identification of Ca-bearing albite ($NaAlSi_3O_8$) as a secondary phase in the antigorite #1 sample provides an explanation for the higher $Al_2O_3$, CaO, $Na_2O$, and $SiO_2$ concentrations, and lower MgO concentration, in that serpentine ore compared to the others listed in Table 1, and illustrates the variety of ores suitable for the practice of the present invention.

The XRD diffraction pattern of the heat-treated product shows a dramatic reduction (about 75%) in peak intensities, and an increase in the background, which is an indication of an increase in concentration of amorphous material, and the emergence of new peaks in the pattern. The heat-treated product still contained the serpentine mineral as a primary phase, but the talc concentration appears to have increased from a trace phase in the raw ore sample to a secondary phase in the heat-treated product. Magnesite was missing from the heat-treated product, because it decomposes at about 350° C. Forsterite olivine ($Mg_2SiO_4$) also appeared as a minor phase as a result of the dehydroxylation of a portion of the serpentine. Increasing heat-treatment temperatures promote greater amounts of water removal and more olivine formation.

As an additional chemical feedstock modification, the serpentine ore was admixed with varying concentrations of silica (quartz) up to about 10 percent by weight and the melting characteristics were determined. Addition of about 10 percent by weight silica to the serpentine ore afforded a liquidus temperature of about 1400° C., which greatly improved the handling characteristics of the molten process stream, particularly lowering the surface tension of the molten ore, which aided in producing larger fiber diameters and lengths compared to the un-modified serpentine feedstock. The degree of liquidus temperature lowering was directly related to the amount of silica added to the ore.

Example 2

Preparation of Mineral Wool from Serpentine Feedstocks

General Procedure for Pilot-Scale Fiberization. A crushed, sieved magnesium silicate feedstock (preferably a serpentine or olivine ore having a maximum particle size of less than about ¾ of an inch, preferably less than ¼ of an inch) is charged into an electric arc furnace including a graphite electrode. The feedstock is heated to a temperature higher than the liquidus temperature of the feedstock (e.g., about 1800° C. or greater) to form a molten ore process stream. Preferably, the ore is heat-treated at a temperature in the range of about 600 to 650° C. prior to melting, to at least partially dehydrate the ore. The molten ore is tapped into a heated ladle (preferably at a tap temperature of about 1700° C., and a ladle temperature of at least about 1600° C.). The molten ore from the ladle is then poured into a heated graphite vessel (i.e., an open, cup-shaped container or tundish) having a tapered bottom with two to three 3/16 inch diameter open holes arrayed in a line across the bottom of the vessel. A separate stream of molten ore exits the bottom of the vessel from each hole by gravity. The streams are then dispersed by blasts of pressurized air emitted perpendicular to the direction of the molten streams into a 2 foot diameter, 26 foot long, horizontal duct (cooling chamber), forming fine molten filaments. The pressurized air is emitted from twin nozzles having 0.25 inch slit openings, attached to 1-inch air inlet lines. The molten filaments cool and solidify as they pass along the duct, carried by the air flow from the air lines. The mass ratio of air-to-molten ore used to disperse the molten ore into filaments preferably is about 10:1. The air mass flow rate was calculated to be about 3817 cubic feet-per-minute (cfm) based on the cross-sectional area of the duct, a molar volume at STP of 359.05 $ft^3$/lb·mole, and an average molecular weight of 28 lb/lb·mole. The solidified mineral wool fibers are collected on a screen in a collection chamber at the distal end of the cooling chamber pipe. The collection chamber is equipped with an air handling and filtering system including a cyclone and bag house to ensure safe operation of the system and to minimize release of fine mineral wool fibers to the environment.

By way of example, two feedstocks were utilized to produce magnesium silicate mineral wool products of the present invention in an apparatus as described above, i.e., a heat-treated serpentine ore, and a silica-modified, heat-treated serpentine ore. A first feed stock comprising unmodified, heat-treated ore was fiberized as described in the general procedure. A second feedstock (silica-modified) comprising the heat-treated ore admixed with about 10 percent by weight silica (quartz) was also fiberized in the same manner.

A chemical comparison of mineral wool fiber produced from the heat-treated material and the silica-modified material is provided in Table 2.

TABLE 2

| Species | Unmodified Mineral Wool | Modified Mineral Wool |
|---|---|---|
| $Al_2O_3$ | 5.686 | 5.856 |
| CaO | 3.318 | 3.290 |
| FeO | 12.433 | 5.580 |
| $Fe_2O_3$ | NA | 0.257 |
| MgO | 30.506 | 27.506 |
| $K_2O$ | 0.349 | 0.255 |
| $SiO_2$ | 45.214 | 54.000 |
| $Na_2O$ | 1.065 | 0.557 |
| Total | 98.571 | 97.301 |

The chemical make-up of the two mineral wools shown in Table 2 is relatively comparable other than the $SiO_2$ concentration and a decrease in FeO for the silica-modified wool. Iron oxide reduction to iron metal was apparently more pronounced in the silica modified wool, which could be useful if an iron by-product were to be separated from the process stream and utilized in its own right as a separate product. The addition of 10 percent by weight quartz also reduced the melting point or liquidus of the silica modified wool to about 1400° C. This later observation is of significance, because FeO acts as an effective fluidizer in molten magnesium silicate, and further reduction of the iron oxides in the ore to metallic iron could produce a higher viscosity melt than is desirable, hindering tapping, filament development and fiber formation. Thus, the addition of quartz (silica) may facilitate processes in which an iron by-product is isolated from the process stream prior to fiberization.

Figure 6:
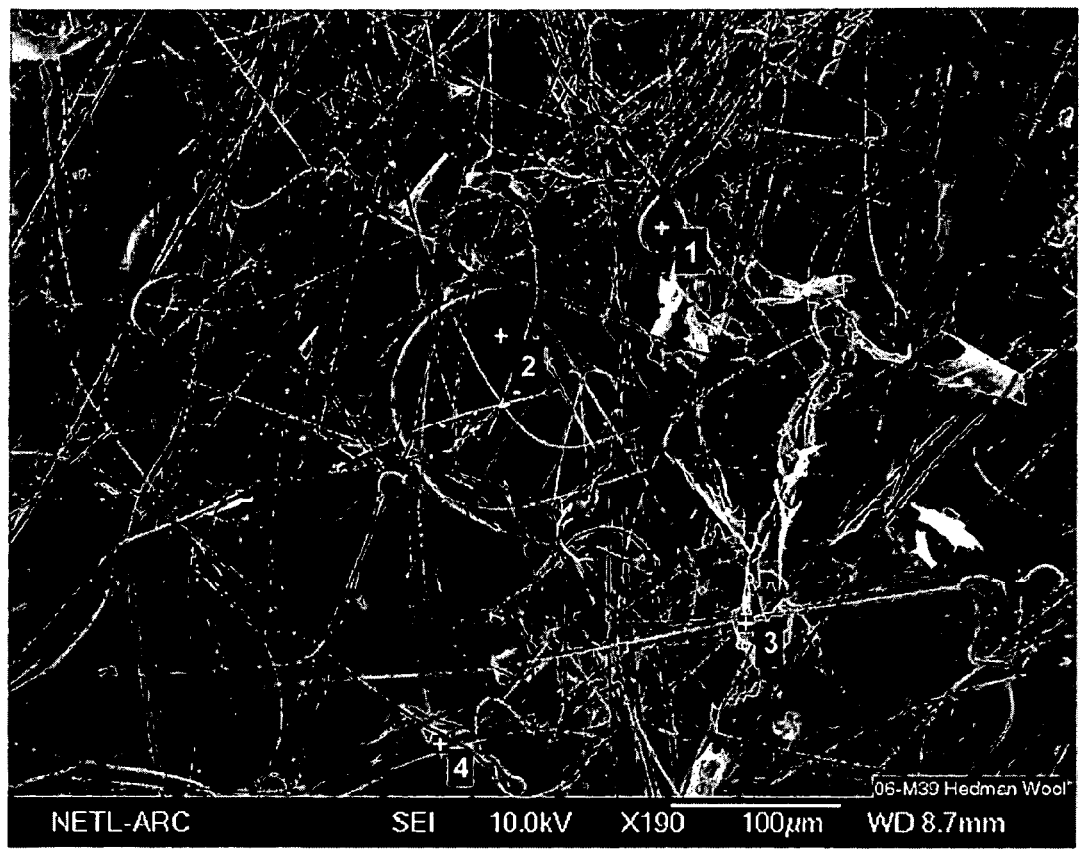
FIG. 6 shows a scanning electron microscopy (SEM) secondary electron image (SEI) of mineral fibers produced from serpentine feedstock.
Figure 7:
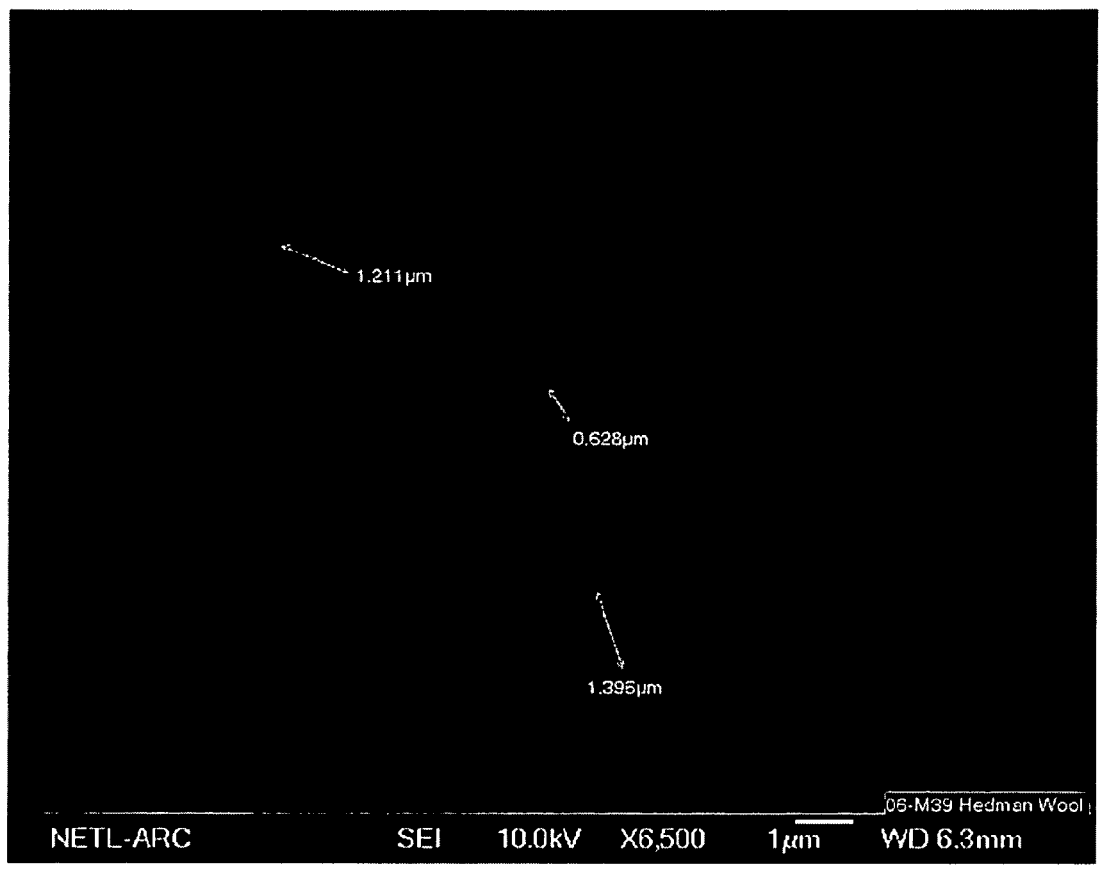
FIG. 7 shows a SEI of mineral fibers produced from serpentine feedstock with fiber dimensions shown.

Scanning electron microscopy (SEM) analyses were performed on the mineral wool materials produced from these pilot-scale production runs. Samples of the mineral wool prepared from heat-treated ore were subjected to both SEM secondary electron imaging (SEI) and SEM backscatter electron (chemical) analysis (BEI). FIG. 6 is a SEI image showing a general view of the unmodified mineral wool fibers and the abundant spherical prills attached at one end of multiple fibers. These prills eventually break off the ends of the fibers and form the shot product that makes up a significant portion of the product from the fiberization process. The literature points out that in theory, fiberization is actually the elongation of these molten spherical particles prior to solidification. FIG. 7 shows dimensional scaling for several typical fibers of the heat-treated wool, which range from less than 1 to roughly 1.5 microns in diameter.

FIG. 6 includes four locations indicated where chemical microanalyses were conducted. The atomic concentrations are reported in percent by weight in Table 3. Sites 1 and 4 in FIG. 6 appeared to be relatively typical examples of the shot and fiber, respectively, and showed very little variation in chemical analysis.

TABLE 3

| Spectrum | In Stats. | O | Na | Mg | Al | Si | K | Ca | Fe | Total |
|---|---|---|---|---|---|---|---|---|---|---|
| 1 | Yes | 45.24 | 0.92 | 19.70 | 3.40 | 28.12 | | 2.62 | | 100.00 |
| 2 | Yes | 33.96 | | 19.48 | 3.25 | 36.98 | | 6.34 | | 100.00 |
| 3 | Yes | 45.32 | | 16.26 | 2.70 | 22.05 | 1.09 | 2.69 | 9.88 | 100.00 |
| 4 | Yes | 33.29 | | 19.34 | 3.21 | 29.03 | | 4.89 | 10.23 | 100.00 |
| Max. | | 45.32 | 0.92 | 19.70 | 3.40 | 36.98 | 1.09 | 6.34 | 10.22 | |
| Min. | | 33.29 | 0.92 | 16.26 | 2.70 | 22.05 | 1.09 | 2.62 | 9.88 | |

All results in weight %

Figure 8:
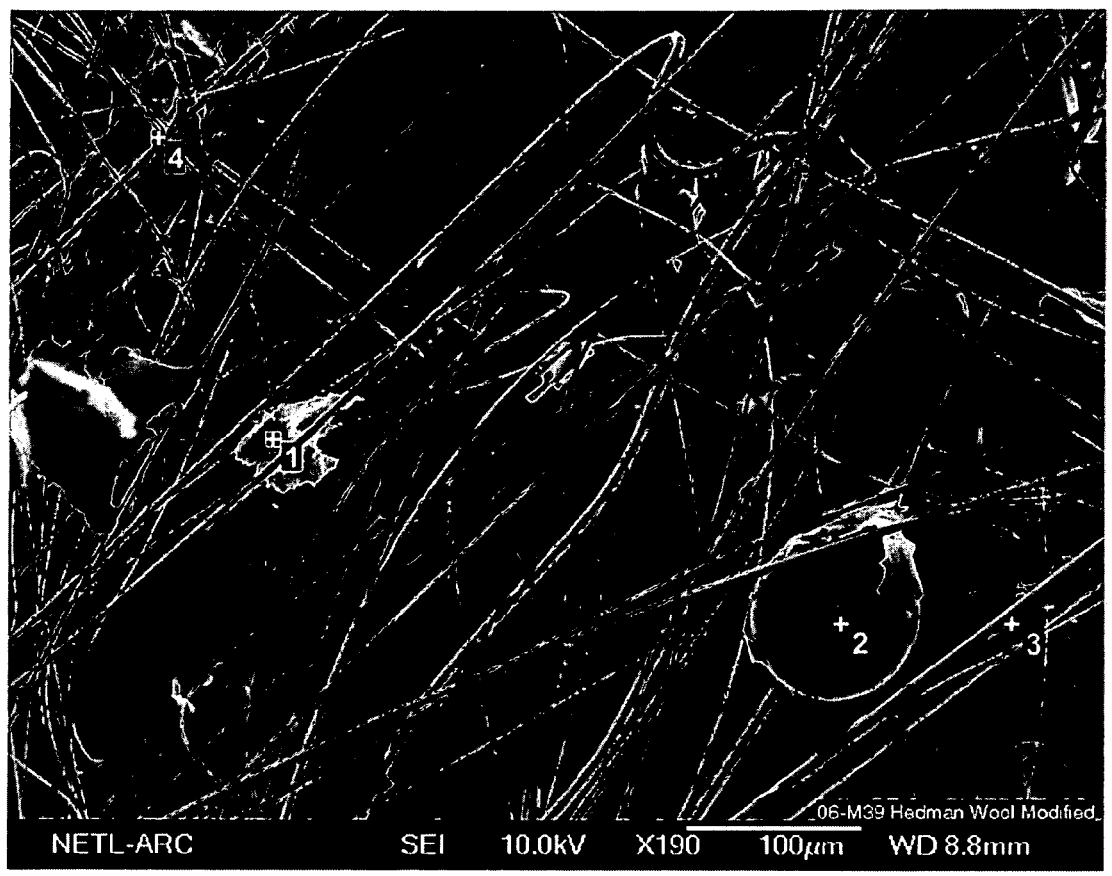
FIG. 8 shows a SEI of mineral fibers produced from silica-modified serpentine feedstock.
Figure 9:
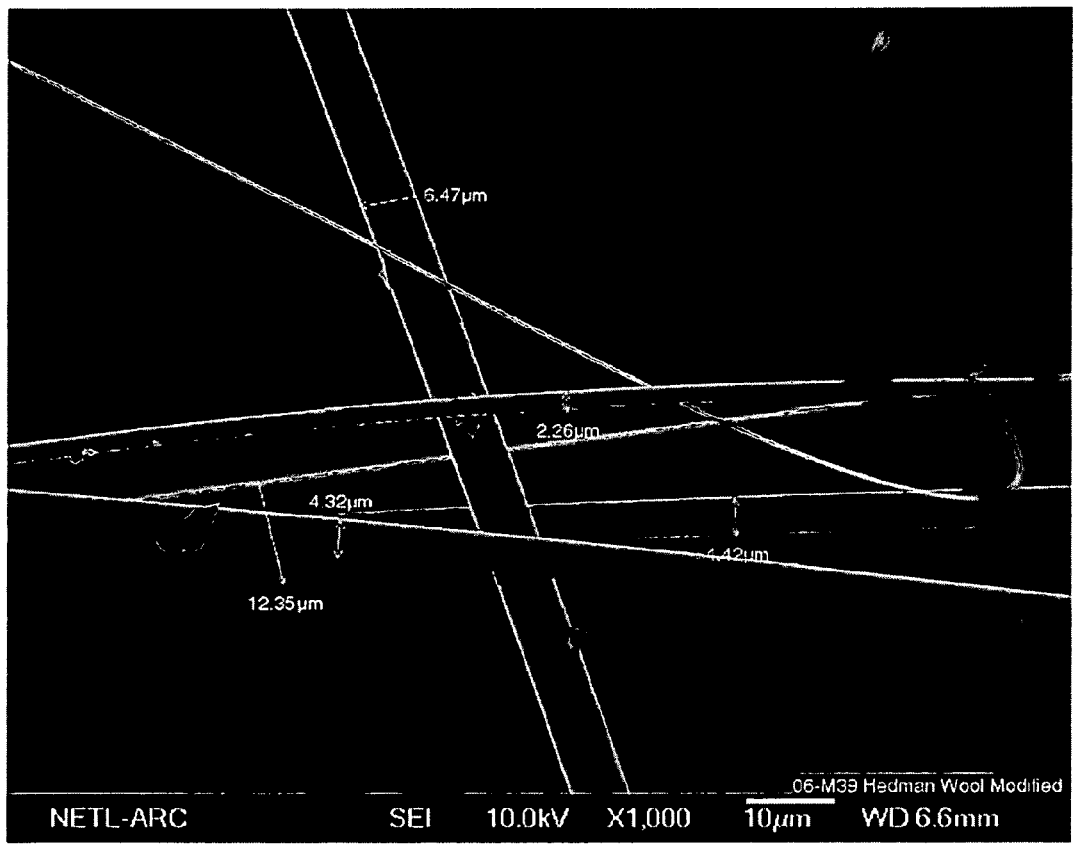
FIG. 9 shows a SEI of mineral fibers produced from silica-modified serpentine feedstock with fiber dimensions shown.

A general view of mineral wool fibers from the silica-modified feedstock is shown in the SEI image in FIG. 8. Most striking is the near absence of the spherical prills attached to the ends of the fibers, with just one prill in the subject field of view. This appears to be typical for the fibers produced from the silica-modified feedstock, which resulted in a significant increase in fiber yield compared to the unmodified feedstock. Apparently, the addition of 10 percent by weight quartz improved the tendency for elongation of the spherical molten particles prior to solidification. Fiber dimensions also differ significantly from the unmodified mineral wool, as shown in FIG. 9. Fiber diameters range from roughly 2 to 12 microns, which is much thicker than the fiber diameters measured for the unmodified mineral wool fibers shown in FIG. 7.

FIG. 8 includes four locations indicated where chemical microanalyses were conducted. The atomic concentrations are reported in Table 4. In FIG. 8, sites 2 and 3 are most typical of the shot and fiber, respectively, and again show a nearly identical chemical analysis.

TABLE 4

| Spectrum | In Stats. | O | Na | Mg | Al | Si | Ca | Fe | Total |
|---|---|---|---|---|---|---|---|---|---|
| 1 | Yes | 46.42 | 0.95 | 15.67 | 3.04 | 24.44 | 2.01 | 7.48 | 100.00 |
| 2 | Yes | 46.59 | | 15.85 | 3.19 | 25.84 | 2.02 | 6.51 | 100.00 |
| 3 | Yes | 44.71 | | 15.86 | 2.74 | 27.68 | 3.12 | 5.89 | 100.00 |
| 4 | Yes | 38.35 | 0.00 | 16.70 | 2.27 | 35.54 | 7.15 | 0.00 | 100.00 |
| Max. | | 46.59 | 0.95 | 16.70 | 3.19 | 35.54 | 7.15 | 7.48 | |
| Min. | | 38.35 | 0.00 | 15.67 | 2.27 | 24.44 | 2.01 | 0.00 | |

All results inweight %

Figure 10:
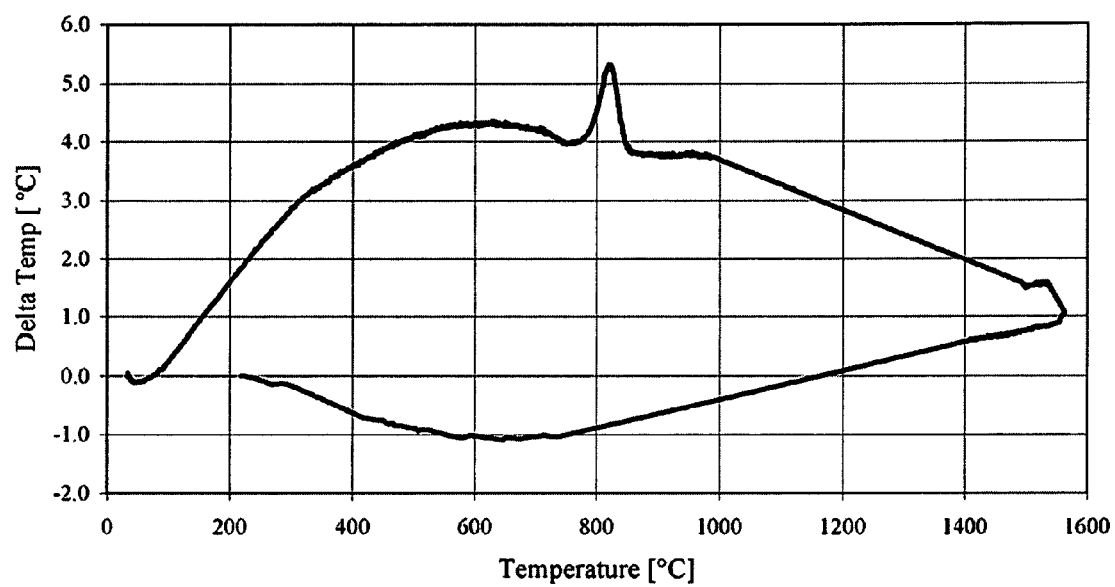
FIG. 10 shows a DTA plot of mineral fibers produced from un-modified serpentine feedstock.
Figure 11:
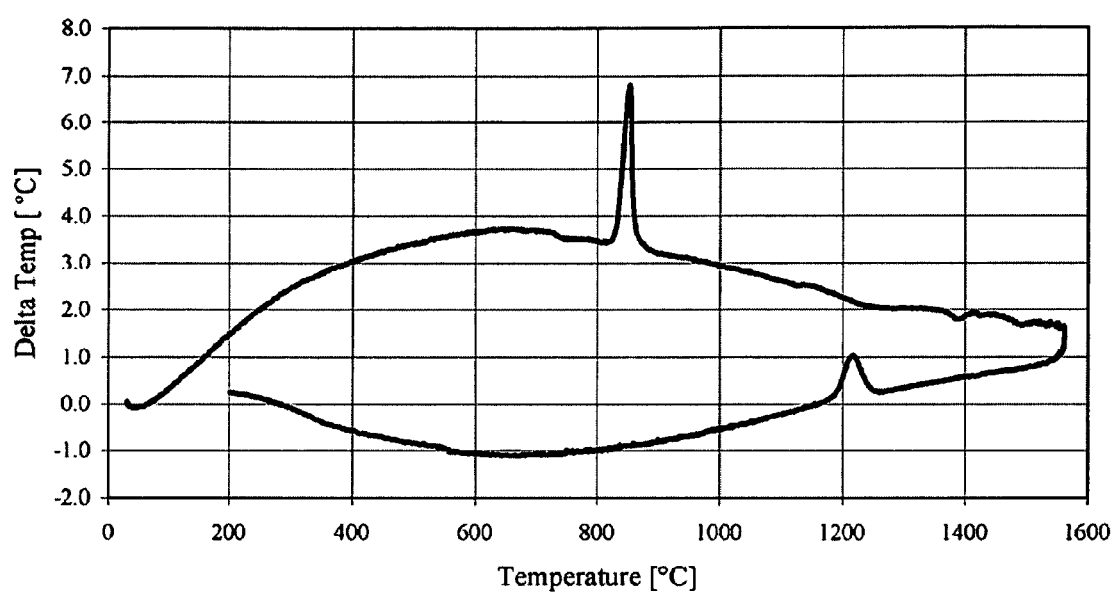
FIG. 11 shows a DTA plot of mineral fibers produced from silica-modified serpentine feedstock.

The fiber samples were also analyzed for thermal properties utilizing differential thermal analysis (DTA). The DTA curves in FIG. 10 and FIG. 11 show thermal changes as the fiber samples were heated up to about 1600° C. A significant exotherm is evident in both fiber samples at a temperature of just over 800° C. This is a common phase transformation temperature for silicates, marking a point of devitrification or transition from glassy to crystalline material. The liquidus or melting temperature for the sample is indicated by an endotherm (decrease in thermal change) due to energy required to melt the sample. There is no clear melting point for the unmodified fiber, other than a slight endotherm at about 1500° C. The liquidus temperature of forsterite olivine is about 1620° C., so it is possible the scan does not include the actual liquidus temperature for this material, since the maximum scan temperature was 1600° C. Two slight endotherms were observed in the DTA of the silica-modified fiber in FIG. 11, one at about 1360° C., and one at about 1500° C. The presence of two endotherms indicates that the fiber may include two distinct phases.

XRD analysis was used to identify crystalline phases in the mineral wool fibers. The rapid cooling achieved in the air jet produces a glassy fiber, as determined by previous XRD analyses. Thus, it was necessary to anneal a sample of the furnace product in order to cool it slow enough for the crystalline phases in to form and be identified by XRD. This was accomplished by collecting a sample of the molten tap product in a small crucible, which was placed in a heat treatment or annealing furnace at 850° C. The sample was held at temperature for about 12 hours, and cooled to room temperature over the next 24 hours. This produced a crystalline product identical in chemical composition to the glassy fiber product. The XRD analysis of the slow-cooled sample identified two phases, a primary phase of forsterite olivine ($Mg_2SiO_4$), and trace phase of enstatite ($MgSiO_3$). The identification of these phases suggests that the silica addition did not change the basic phase chemistry of the furnace product, which can still be accurately described as primarily being an "olivine wool" or fiber.

While there has been disclosed what is considered to be the preferred embodiment of the present invention, it is understood that various changes in the details may be made without departing from the spirit, or sacrificing any of the advantages of the present invention. The embodiments of the invention in which an exclusive property or privilege is claimed are defined in the appended claims.

We claim:

1. A method of producing a mineral wool comprising:
   obtaining a feedstock comprised of serpentine, where the serpentine is hydroxylated with chemically bound water, and where the feedstock is a plurality of particles having an average diameter of one-quarter inch or less;
   pre-heating the feedstock at a temperature of from about 600° C. to about 650° C. and for a period of at least 30 minutes per ton of feedstock, thereby producing a pre-heated feedstock;
   melting the pre-heated feedstock to form a molten feedstock stream; and
   fiberizing the molten feedstock stream to produce the mineral wool.

2. The method of claim 1, where the feedstock is comprised of oxide components, where the oxide components are comprised of $SiO_2$ and MgO and less than 10 weight percent CaO, where the weight percent ratio of CaO to MgO is less than 0.2 and where the weight percent summation of MgO and CaO is at least 25 weight percent.

3. The method of claim 2 further comprising adding a silicon dioxide addition to the feedstock or the pre-heated feedstock such that the pre-heated feedstock is further comprised of the silicon dioxide addition, where the silicon dioxide addition is comprised of silica or quartz, and where the silicon dioxide addition is added in a quantity such that the silicon dioxide addition comprises at least 10 weight percent of the pre-heated feedstock.

4. The method of claim 2 further comprising adding a silicon dioxide addition to the feedstock or the pre-heated feedstock such that the pre-heated feedstock is further comprised of the silicon dioxide addition, where the silicon dioxide addition is comprised of silica or quartz, and where the silicon dioxide addition is present in the pre-heated feedstock at a concentration sufficient to afford a liquidus temperature of about 1400° C.

5. The method of claim 2 where the oxide components are comprised of an iron oxide and where the pre-heated feedstock is further comprised of a carbon reductant, and where melting the pre-heated feedstock to form the molten feedstock stream is further comprised of:
  segregating an Fe heel; and
  withdrawing an iron product tap, where the iron product tap is comprised of the Fe heel.

6. The method of claim 2 where fiberizing the molten feedstock stream is comprised of:
  maintaining the molten process stream at least 50° C. above the liquidus of the molten process stream; and
  forming one or more streamlets from the molten process stream and dispersing the one or more streamlets through a gas having a gas temperature below the melting temperature of the molten process stream, thereby fiberizing the molten feedstock stream to produce the mineral wool.

7. The method of claim 6 where the feedstock is a first portion of a feedstock batch, where the feedstock batch is comprised of serpentine, where the serpentine is hydroxylated with chemically bound water, such that the pre-heated feedstock, the molten feedstock stream, and the mineral wool results from the first portion of the feedstock batch, and where the mineral wool resulting from the first portion of the feedstock batch is comprised of a plurality of fibers and a quantity of shot, where each fiber in the plurality of fibers has a length at least two times greater than an average diameter of the fiber over the length of the fiber, and further comprising:
  separating some portion of the quantity of shot from the plurality of fibers; and
  repeating the preheating step, the melting step, and the fiberizing step using a second portion of the feedstock batch as the feedstock, and adding an amount of the some portion of the quantity of shot to the second portion of the feedstock batch prior to the melting step, such that the mineral wool is produced from the second portion of the feedstock batch and the some portion of the quantity of shot.

8. The method of claim 7 further comprising adding a silicon dioxide addition to the feedstock or pre-heated feedstock generated from the second portion of the feedstock batch and the some portion of shot, where the silicon dioxide addition is comprised of silica or quartz, such that the mineral wool is produced from the second portion of the feedstock batch and the some portion of the quantity of shot and further from the silicon dioxide addition.

9. The method of claim 8 where the silicon dioxide addition is added in a quantity such that a mixture of the second portion of the feedstock batch, the some portion of the quantity of shot, and the silicon dioxide addition has a liquidus temperature of about 1400° C.

10. The method of claim 1, wherein the feedstock further comprises one or more material selected from the group consisting of olivine, talc, forsterite, dunite, and a combination of two or more of the foregoing.

11. A method of producing a mineral wool comprising:
  obtaining a feedstock comprised of serpentine, where the feedstock is a plurality of particles having an average diameter of one-quarter inch or less, and where the serpentine is hydroxylated with chemically bound water, and where the feedstock is comprised of oxide components, where the oxide components are comprised of $SiO_2$ and MgO and less than 10 weight percent CaO, where the weight percent ratio of CaO to MgO is less than 0.2 and where the weight percent summation of MgO and CaO is at least 25 weight percent;
  pre-heating the feedstock at a temperature of from about 600° C. to about 650° C. and for a period of at least 30 minutes per ton of feedstock, thereby producing a pre-heated feedstock;
  melting the pre-heated feedstock to form a molten feedstock stream, and maintaining the molten process stream at least 50° C. above the liquidus of the molten process stream; and
  forming one or more streamlets from the molten process stream and dispersing the one or more streamlets through a gas having a gas temperature below the melting temperature of the molten process stream, thereby fiberizing the molten feedstock stream to produce the mineral wool.

12. The method of claim 11 further comprising adding a silicon dioxide addition to the feedstock or the pre-heated feedstock such that the pre-heated feedstock is further comprised of the silicon dioxide addition, where the silicon dioxide addition is comprised of silica or quartz, and where the silicon dioxide addition is present in the pre-heated feedstock at a concentration sufficient to afford a liquidus temperature of about 1400° C.

13. The method of claim 12 where the feedstock is a first portion of a feedstock batch, where the feedstock batch is comprised of serpentine, where the serpentine is hydroxylated with chemically bound water, such that the pre-heated feedstock, the molten feedstock stream, and the mineral wool results from the first portion of the feedstock batch, and where the mineral wool resulting from the first portion of the feedstock batch is comprised of a plurality of fibers and a quantity of shot, where each fiber in the plurality of fibers has a length at least two times greater than an average diameter of the fiber over the length of the fiber, and further comprising:
  separating some portion of the quantity of shot from the plurality of fibers; and
  repeating the preheating step, the melting step, and the fiberizing step using a second portion of the feedstock batch as the feedstock, and adding an amount of the some portion of the quantity of shot to the second portion of the feedstock batch prior to the melting step, such that the mineral wool is produced from the second portion of the feedstock batch and the some portion of the quantity of shot.

14. The method of claim 13 where the feedstock batch is comprised of a plurality of particles having an average diameter equal to or less than ¼", and where the pre-heating is conducted at the temperature of from about 600° C. to about 650° C. and for the time of from about 30 minutes per ton of feedstock batch to about 120 minutes per ton of feedstock batch.

15. The method of claim 13 where the oxide components are comprised of an iron oxide and where the pre-heated feedstock is further comprised of a carbon reductant, and where melting the pre-heated feedstock to form the molten feedstock stream is further comprised of:
   segregating an Fe heel; and
   withdrawing an iron product tap, where the iron product tap is comprised of the Fe heel.

16. A method of producing a mineral wool comprising:
   obtaining a feedstock batch comprised of serpentine, where the feedstock is a plurality of particles having an average diameter of one-quarter inch or less, and where the serpentine is hydroxylated with chemically bound water, and where the serpentine, the olivine, or the talc, or the combination of two or more of the foregoing is comprised of oxide components, where the oxide components are comprised of $SiO_2$ and MgO and less than 10 weight percent CaO, where the weight percent ratio of CaO to MgO is less than 0.2 and where the weight percent summation of MgO and CaO is at least 25 weight percent;
   generating a first portion of the feedstock batch;
   pre-heating the first portion at a temperature of from about 600° C. to about 650° C. and for a period of at least 30 minutes per ton of feedstock, thereby producing a pre-heated feedstock;
   adding a silicon dioxide addition to the pre-heated feedstock such that the pre-heated feedstock is further comprised of the silicon dioxide addition, where the silicon dioxide addition is comprised of silica or quartz, and where the silicon dioxide addition is present in the pre-heated feedstock at a concentration sufficient to afford a liquidus temperature of about 1400° C.;
   melting the pre-heated feedstock to form a molten feedstock stream, and maintaining the molten process stream at least 50° C. above the liquidus of the molten process stream;
   forming one or more streamlets from the molten process stream and dispersing the one or more streamlets through a gas having a gas temperature below the melting temperature of the molten process stream, thereby fiberizing the molten feedstock stream to produce a plurality of fibers and a quantity of shot, where each fiber in the plurality of fibers has a length at least two times greater than an average diameter of the fiber over the length of the fiber;
   separating some portion of the quantity of shot from the plurality of fibers, thereby producing a first portion of the mineral wool, and adding an amount of the some portion of the quantity of shot to a second portion of the feedstock batch; and
   repeating the preheating step, the melting step, the forming step and the separating step using the second portion of the feedstock batch as the first portion of the feedstock batch, and continuing the repeating until the entirety of the feedstock batch has been utilized to produce a portion of the mineral wool.

17. The method of claim 16 where the oxide components are comprised of an iron oxide and where the pre-heated feedstock is further comprised of a carbon reductant, and where melting the pre-heated feedstock to form the molten feedstock stream is further comprised of:
   segregating an Fe heel; and
   withdrawing an iron product tap, where the iron product tap is comprised of the Fe heel.

* * * * *